April 22, 1969  D. L. McFARLAND ET AL  3,439,437
STEAMING AND PRESSING DEVICE
Filed July 13, 1966  Sheet 1 of 5

INVENTORS
DONALD L. McFARLAND
GLEN ROBINSON
BY Samuel Lindenberg
Arthur Freilich
ATTORNEYS INVENTORS
DONALD L. McFARLAND
GLEN ROBINSON
BY *Samuel Lindenberg*
*Arthur Frielich*
ATTORNEYS

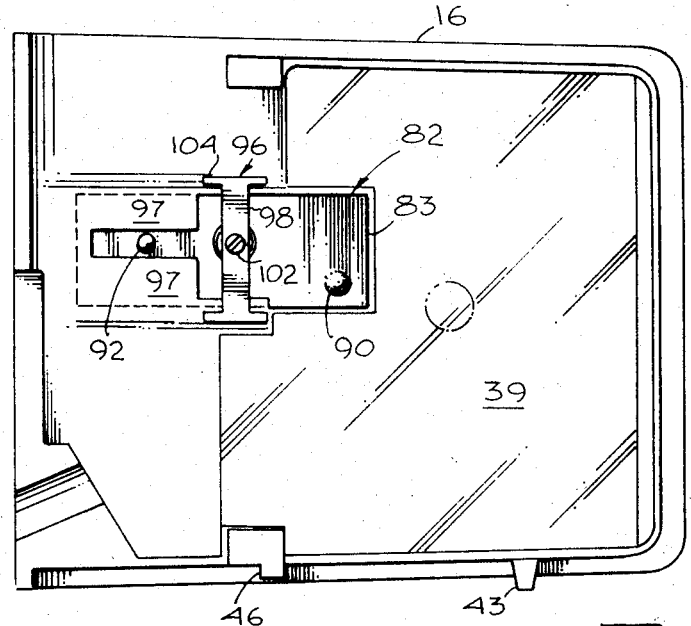
Fig. 6
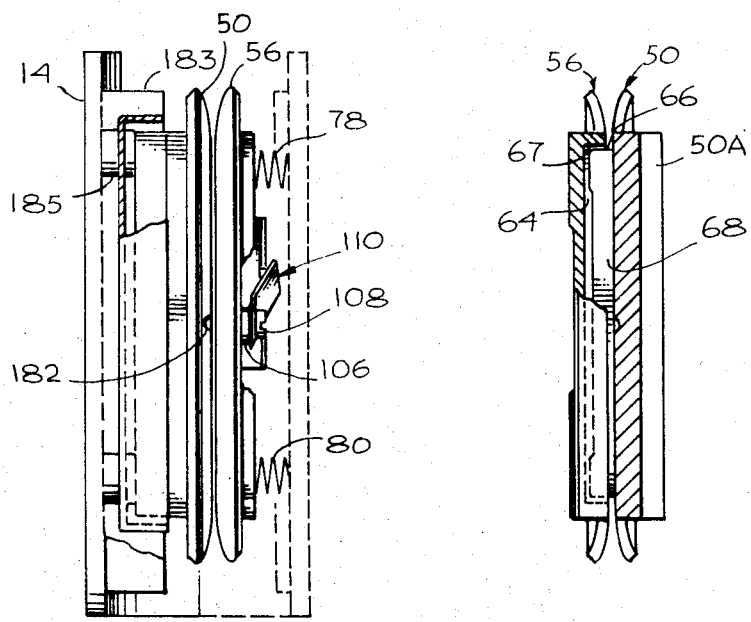
Fig. 7
Fig. 8

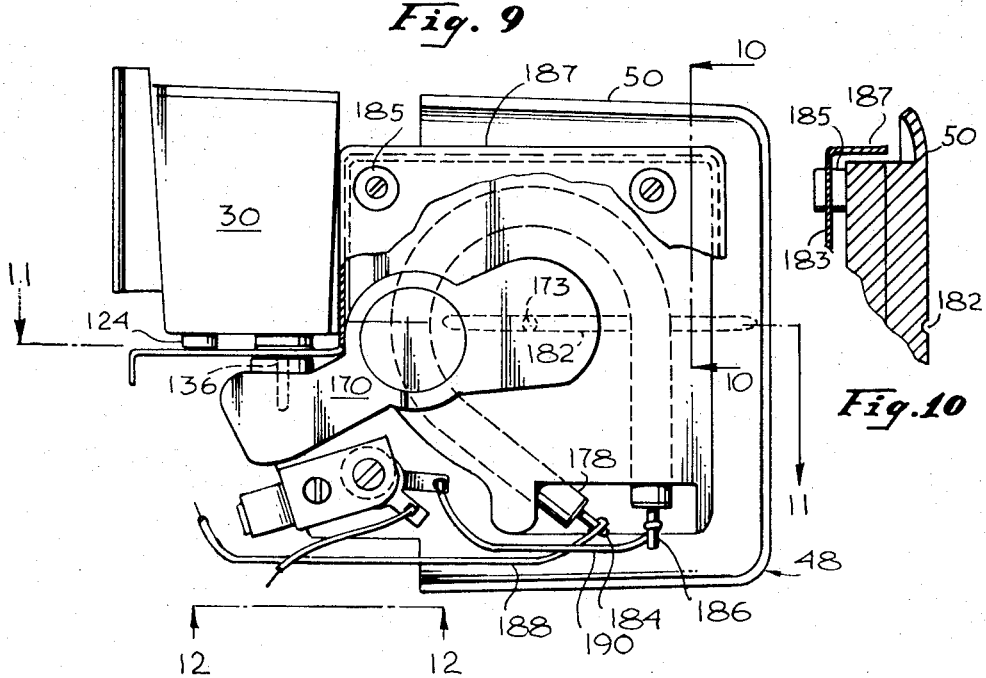
Fig. 9
Fig. 10
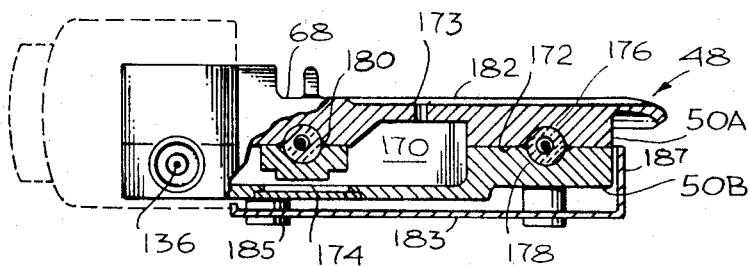
Fig. 11
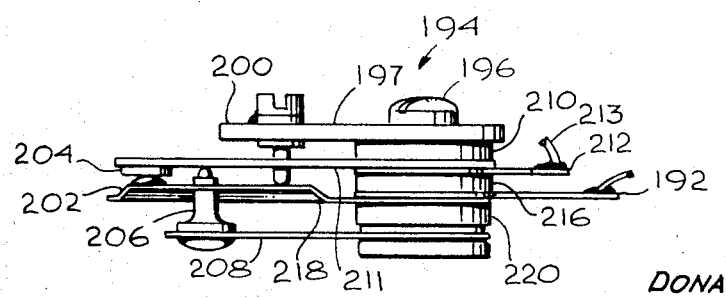
Fig. 12
INVENTORS
DONALD L. McFARLAND
GLEN ROBINSON
BY Samuel Lindenberg
Arthur Freilich
ATTORNEYS April 22, 1969 D. L. McFARLAND ETAL 3,439,437
STEAMING AND PRESSING DEVICE
Filed July 13, 1966 Sheet 5 of 5

INVENTORS
DONALD L. McFARLAND
GLEN ROBINSON
BY *Samuel Lindenberg*
*Arthur Frielich*
ATTORNEYS

United States Patent Office 3,439,437
Patented Apr. 22, 1969

3,439,437
STEAMING AND PRESSING DEVICE
Donald L. McFarland, Long Beach, and Glen Robinson, Pasadena, Calif., assignors, by mesne assignments, to Westinghouse Electric Corporation, Pittsburgh, Pa., a corporation of California
Filed July 13, 1966, Ser. No. 564,782
Int. Cl. D06f 75/14
U.S. Cl. 38—71                           33 Claims

ABSTRACT OF THE DISCLOSURE

A hand held device suitable for steaming and dry pressing fabrics to remove wrinkles therefrom and form creases therein. The device includes a pair of spaced heat insulating panels. Opposed heating plates are supported between the panels for movement toward and away from one another. Heating means are associated with at least one of the plates and selectively acuatable steam generating means are provided for directing steam between the plates.

This invention relates to an apparatus useful for steaming fabrics to remove wrinkles therefrom and for pressing and forming creases in fabric articles, such as curtains, drapes, trousers, and the like.

It has long been recognized that a need exists for a relatively inexpensive hand-held device which can be simply used to effectively steam, press and form creases in fabric. As a consequence of this recognition, many attempts have been made to develop such a device and the prior art is therefore replete with devices intended to accomplish this purpose. However, despite these attempts, no such devices have thus far been developed which satisfactorily perform the intended function.

Accordingly, it is an object of the present invention to provide an improved device capable of being used to effectively steam, press and crease fabric. It is a more particular object of the present invention to provide such a device which is sufficiently compact to enable it to be conveniently held in and operated by only one hand.

Briefly, in accordance with a preferred embodiment of the present invention, a device is provided including first and second substantially rectangular opposed plates, at least one of which is capable of being electronically heated. A first of the plates is fixedly mounted in a casing. The second plate is mounted in the casing in a manner which permits it to exhibit what may be considered floating movement relative to the first plate or more exactly the second plate is mounted so it can exhibit limited movement, against spring biasing means, in certain translational and rotational directions relative to the first plate. More particularly, the second plate is able to limitedly rotate about first and second substantially perpendicular axes respectively extending parallel to adjacent sides of the plates. In addition, the second plate is able to translate along a third axis extending substantially perpendicular to the plates. Translation along the first and second axes and rotation about the third axis is restricted.

By mounting the second plate so it has the degrees of translational and rotational freedom mentioned, it is effectively free-floating relative to the fixed plate. Thus, varying thicknesses of fabric can be accommodated between the plates without stretching or otherwise deforming the fabric. In order to facilitate the insertion of fabric between the plates, a manually operable actuator is provided on the casing which is coupled to the second plate for the purpose of translating it along the third axis to move it away from the first plate when the actuator is pressed.

In accordance with a significant feature of a preferred embodiment of the present invention, means are provided for producing steam and for discharging it between the plates. The steam is effective to remove wrinkles from fabric. The heat which is applied to the fabric by the plates is effective to set a desired crease therein. In order to discharge the steam between the plates, a steam aperture is preferably provided in the fixed plate which communicates with a steam channel extending the full depth of the plate. The steam channel is disposed substantially at the center of the plate width so that regardless of which direction the device is moved relative to the fabric, there will be sufficient hot plate area passing over the fabric after the passage of the steam channel, to dry the fabric and set the crease. Preferably, the plates are coated with a low friction material, e.g. a fluorocarbon material such as that sold by Du Pont under the trade name "Teflon," which enables the plates to be easily pulled over the fabric.

In accordance with a still further feature of the present invention, a water tank is provided from which water drops can be dispensed into a steam generating chamber communicating with the steam aperture. Preferably, the previously referred to manually operable actuator is mounted as a rocker arm so that in a first depressed position it moves the second plate and in a second depressed position it operates a valve in the water tank to release water into the steam chamber.

In accordance with a still further feature of the present invention, a flexible diaphragm is provided over an opening in a side wall of the water tank which permits a force applied to the actuator to be coupled to the valve in the water tank.

In accordance with a still further feature of the present invention, for safety considerations, the water tank is removably mounted in the device in a manner which requires it to be removed therefrom in order to fill it with water.

The novel features that are considered characteristic of this invention are set forth with particularity in the appended claims. The invention will best be understood from the following description when read in connection with the accompanying drawings, in which:

FIGURE 6 is a sectional view taken substantially along the plane 6—6 of FIGURE 4(a);

FIGURE 7 is a sectional view taken substantially along the plane 7—7 of FIGURE 4(b);

FIGURE 8 is a sectional view taken substantially along the plane 8—8 of FIGURE 4(b);

FIGURE 9 is a sectional view taken substantially along the plane 9—9 of FIGURE 2;

FIGURE 10 is a sectional view taken substantially along the plane 10—10 of FIGURE 9;

FIGURE 11 is a sectional view taken substantially along the plane 11—11 of FIGURE 9;

FIGURE 12 is a sectional view of a thermostate means taken substantially along the plane 12—12 of FIGURE 9;

Figure 1:
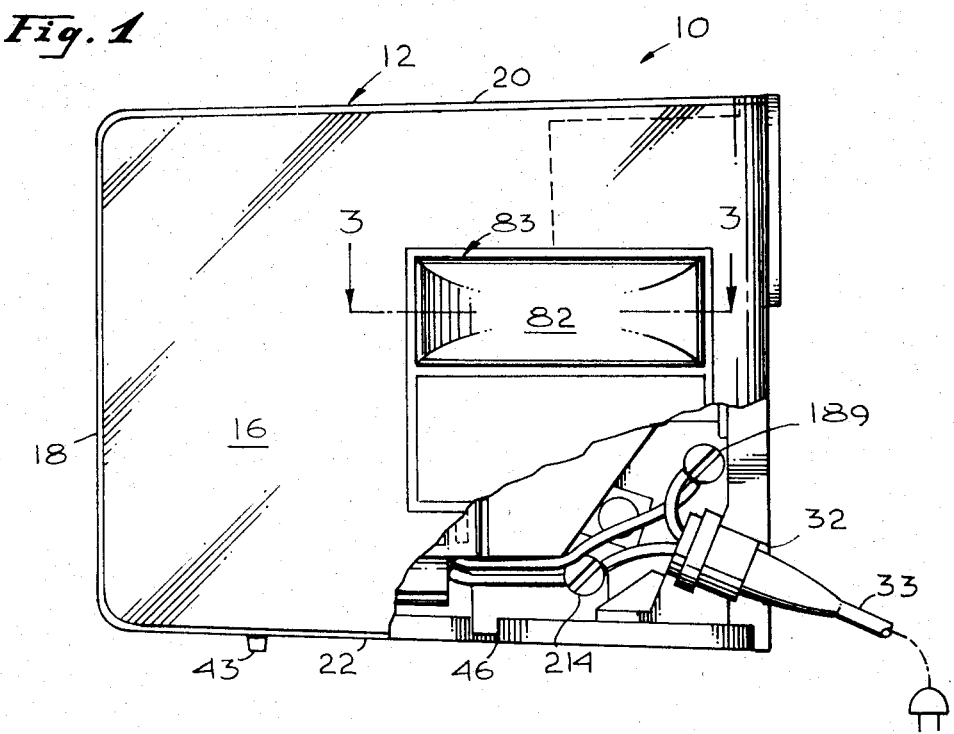
FIGURE 1 is a side elevational view, partially broken away, illustrating a preferred embodiment of the invention.
Figure 2:
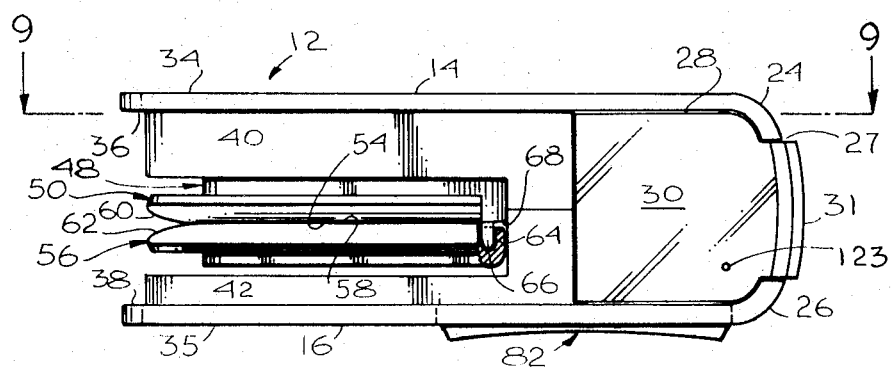
FIGURE 2 is a plan view of the preferred embodiment of the invention.

Attention is initially called to FIGURES 1 and 2 wherein a device 10 comprising a preferred embodiment of the invention is illustrated. The device 10 is comprised of an outer casing 12 including first and second side panels 14 and 16. The side panels 14 and 16 are each substantially rectangular having a front edge 18, a top edge 20, and a bottom edge 22. The panels 14 and 16 curve inwardly to define rear surfaces 24 and 26. The panels 14 and 16 are preferably formed of a material which acts as a good heat and electrical insulator.

The panels 14 and 16 are spaced from one another but are held in fixed relationship to one another by an appropriate fastening means such as a bolt (not shown). The rear surfaces 24 and 26 of the panels 14 and 16 engage each other along a line beginning beneath a cut out area 27 defined therein. The cut out area 27 communicates with a pocket 28 provided for receiving a water tank 30 to be discussed in greater detail hereinafter. The water tank 30 has a rear projection 31 which extends into the cut out area 27. An opening 32 is defined in the rear surfaces 24 and 26 through which a power cord 33 is inserted. The power cord is intended to be connected to any suitable source of power (not shown), e.g. a 110 volt alternating current source.

The panels 14 and 16 have outer surfaces 34 and 35 respectively and inner surfaces 36 and 38 respectively. The outer surfaces 34 and 35 preferably have a simulated leather grain or other irregular surface in order to provide a greater amount of surface area for radiating heat. In addition, it is desirable to place a heat reflector sheet (e.g. aluminum foil 39, FIGURE 6) on the inner surfaces of the casing panels 14, 16 to maintain the panels cool. That is, the heat reflector sheets restrict heat flow through the panels 14 and 16. The inner surfaces 36 and 38 preferably have peripheral walls 40 and 42 projecting inwardly therefrom. Aligned portions of a supporting foot 43 extend downwardly from the walls 40 and 42. The foot 43, together with the lower edge of rear edges 24 and 26, are able to support the device 10 on a flat surface in the orientation shown in FIGURE 1. As will be better appreciated hereinafter, storage of the device in a vertical orientation provides a chimney effect between the casing panels and better enables heat to be radiated therefrom when the device is not in use but while the power cord is connected to the power source. In addition to the foregoing, a finger guard 46 is also formed along the bottom edge of the casing to prevent a finger of the user from touching the pressing plates, to be described later.

A heating structure and steam generating means 48 (shown in greater detail in FIGURES 9 and 11) is supported from the inner surface 36 of the panel 14 and is substantially surrounded by the peripheral wall 40 (FIGURE 2). The heating structure and steam generating means 48 includes a first pressing plate 50 which is fixedly secured to the panel 14. The plate 50 has a substantially flat surface 54 directed toward the panel 16.

A movable second plate 56 having a substantially flat surface 58 is disposed opposite to the plate 50. The plates 50 and 56 are provided with curved edges 60 and 62 respectively which, as will become apparent, facilitate the insertion of a piece of fabric (not shown) therebetween. The plates 50 and 56 are both substantially rectangular and similarly dimensioned. Although exact dimensions are not critical, it has been found to be most appropriate for the plates to have a flat area of about 7.5 square inches.

Figure 4A:
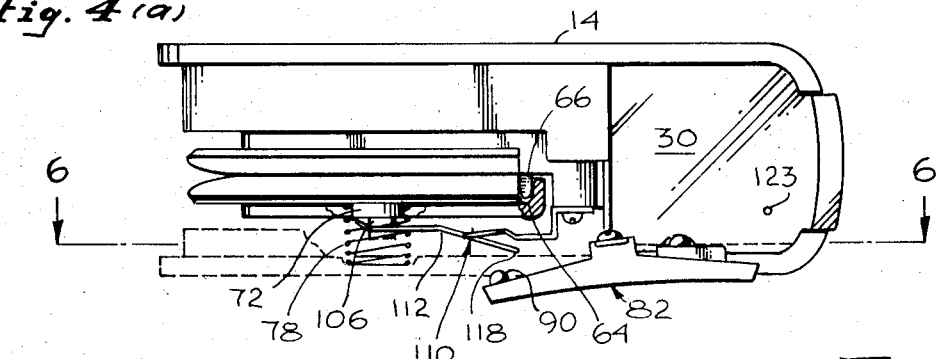
FIGURE 4(a) is a plan view of a preferred embodiment of the invention, partially broken away, to illustrate the manually actuatable rocker arm in a first depressed valve-actuating position.
Figure 4B:
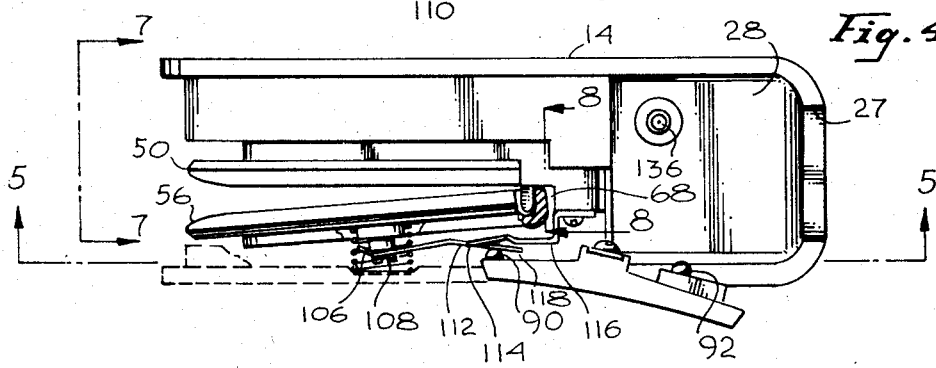
FIGURE 4(b) is a plan view of a preferred embodiment of the invention, partially broken away, to illustrate the manually actuatable rocker arm in a second depressed plate-separating position and with its water tank removed.

The plate 56 adjacent the rear edge thereof, defines a substantially U-shaped channel 64. The plate 50 has a flange 66 (FIGURE 2) along the rear edge thereof. The flange 66 extends into the channel 64 as is illustrated in FIGURES 2, 4(a), and 4(b). It is to be noted that inasmuch as the cross-section of the channel 64 is larger than that of the flange 66, the flange fits very loosely within the channel. As is illustrated in FIGURE 8, the ends 67 of the channel 64 are closed thus preventing the flange 66 from translating along the channel.

Figure 5:
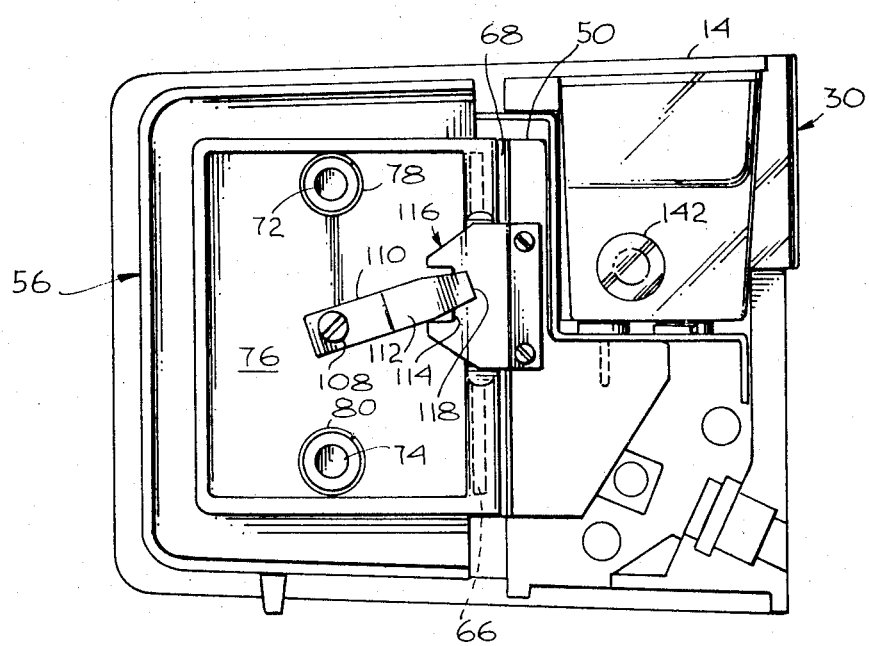
FIGURE 5 is a sectional view taken substantially along the plane 5—5 of FIGURE 4(b)

First and second bosses (FIGURE 5) 72 and 74 are formed on the under surface 76 of the movable plate 56. Coil springs 78 and 80 fit around the bosses 72 and 74 bearing between the plate 56 and panel 16. Thus, the plate 56 is normally urged against the plate 50. Although variations in the spring force can be tolerated, it is important that the spring force be great enough to bring the plates together against fabric inserted therebetween but it is equally important that the force not be so great as to stretch the fabric as the device is moved over it. It has been found that a suitable force, as low as 6 ounces, but preferably on the order of 10 ounces, be utilized thus providing a pressure of 1.33 pounds per square inch for the 7.5 square inch plates mentioned.

A manually actuable rocker arm 82 is retained within an opening 83 in the casing panel 16. The rocker arm is normally retained in a neutral position as shown in FIGURE 2 and can be manually pivoted in a first direction to move the plate 56 away from plate 50 as shown in FIGURE 4(b) or in a second direction [FIGURE 4(a)] to bear against an opening in a side wall of the water tank 30 to actuate a valve therein.

More particularly, the rocker arm 82 (shown in detail in FIGURE 3) is comprised of a central boss 84 having an opening 86 defined therein. An internally threaded insert 88 is retained in the opening 86. A protuberance 90 is disposed on the under surface of one end of the rocker arm 82 while a second protuberance 92 is supported on a block 94 on the second end of the rocker arm under surface.

Figure 3:
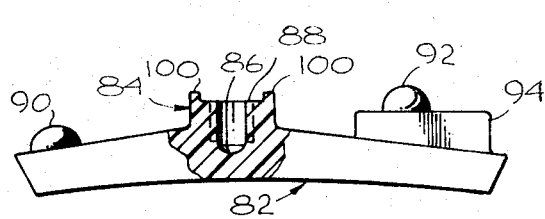
FIGURE 3 is a sectional view of the manually actuatable rocker arm taken substantially along the plane 3—3 of FIGURE 1.

As shown in FIGURE 6, the rocker arm 82 is retained in its neutral position in the opening 83 in the casing panel 16 by an I-shaped leaf spring 96. More particularly, the vertical central portion 98 of the leaf spring 96 fits between projections 100 on the boss 84 (FIGURE 3). The portion 98 has an aperture therein which is adapted to be aligned with the opening 86 and the boss 84. A short screw 102 fits through the aperture in the vertical portion 98 of the spring 96 and is threaded into the insert 88. The horizontal end portions 104 of the spring 96 bear against the inner surface of the casing panel 16 around the opening 83. Thus, the spring 96 secures the rocker arm 82 to the panel 16. The opening 83 is shaped to define a pair of spaced stops 97 (FIGURE 6) which limit the inward movement of the rocker arm toward the plate 56. The block 94 carrying the protuberance 92 is dimensioned so as to fit between the spaced stops 97.

An additional boss 106 [FIGURES 4(a), 4(b), 7] is provided on theh under surface 76 of the plate 56 substantially at the center thereof. The boss 106 is centrally internally threaded and receives screw 108 therein which retains lever 110. Lever 110 has an offset end portion 112 which bears against edge 114 (FIGURE 5) of a fulcrum plate 116 secured to the pressing plate 50. The end 118 of the offset portion 112 of the lever 110 is disposed immediately adjacent to the protuberance 90 on the undersurface of the rocker arm 82. Thus, when the rocker arm 82 is depressed to the position shown in FIGURE 4(b), the protuberance 90 engages the end 118 of the lever 110 to rotate the lever around an axis coincident with edge 114 of the fulcrum plate 116. Thus, a force is transferred to the screw 108 at the center of the under surface of plate 56 which pulls the plate 56 away from plate 50 against the springs 78 and 80 to open the plates as shown in FIGURE 4(b). With the plates open in this manner, a piece of fabric can easily be inserted between the plates. When the manual pressure on the rocker arm 82 is released, the leaf spring 96 returns it to its neutral position (as shown in FIGURE 2) and the springs 78 and 80 urge the plate 56 toward the plate 50.

It is to be noted that the U-shaped channel 64 has larger cross-sectional dimensions than the flange 66 and as a consequence the plate 56 is able to exhibit limited rotational movement about a first axis substantially coincident with the rear edges of plates 50 and 56, FIGURE 4(b). Also the plate 56 can exhibit limited rotational movement about a second axis extending substantially perpendicular to the first axis and lying in a plane approximately parallel to the plate 50. The other degree of rotational movement, i.e. about a third axis extending perpendicular to the plates 50 and 56, is limited by engagement of the flange 66 with the walls forming channel 64. Relative translation between the plates 50 and 56 is permitted primarily in only one direction, i.e. along the third axis inasmuch as the flange 66 can move into and out of the U-shaped channel 64. Relative translation between the plates 50 and 56 along the first axis is limited as a consequence of the flange 66 on plate 50 being disposed between the closed ends 67 of channel 64. Translation along the second axis is limited by the fact that the flange 66 extends into the U-shaped channel 64.

Thus, it should now be appreciated that by manually depressing the rocker arm 82 to the position shown in FIGURE 4(b), the plates 50 and 56 will separate to permit the insertion of a piece of fabric or the like. By then releasing the rocker arm 82, the springs 78 and 80 will close the plates 50 and 56 on the fabric. The entire device can then be moved along the fabric to press it. As previously noted, the plates 50 and 56 are preferably provided with a low friction fluorocarbon coating to facilitate this movement. As a consequence of the manner in which the plate 56 is mounted, permitting it to somewhat float relative to the plate 50, variations in thickness of the fabric can be easily accommodated without stretching the fabric.

In order to effectively set a new crease or renew a crease in fabric, it is essential to apply heat thereto. In order to assure even better performance, it is desirable to provide steam for removing any wrinkles from the fabric. The device 10 shown herein includes means for providing both heat and steam to a piece of fabric between the plates 50 and 56. As will be seen hereinafter, heat is applied merely as a consequence of the power cord 33 being connected to a suitable power source. Steam is applied in response to the rocker arm 82 being depressed to the position shown in FIGURE 4(a).

Figure 13:
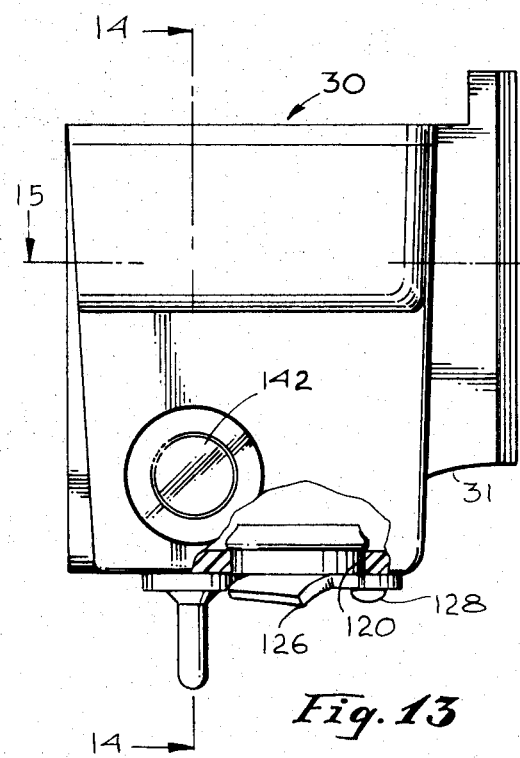
FIGURE 13 is an enlarged side elevational view, partially broken away, of a preferred form of water tank.

The water tank 30 (FIGURES 13-15) is preferably designed to require removal from the pressing device 10 for filling. The fully enclosed tank has a fill opening 120 and an outlet opening 122 both defined in the bottom surface 124 of the water tank 30. In addition, a small vent opening 123 is defined in the top water tank surface 125. A seal 126 adapted to close the fill hole 122 is held captive to the surface 124 by a screw 128. The outlet opening 122 communicates with an outlet stem 130. The water tank 30 is receivable in the previously mentioned pocket 28 between the panels 14 and 16 as is shown in FIGURES 1 and 2 for example. When the water tank 30 is properly inserted in the pocket 28, the outlet stem 130 projects into a steam chamber inlet opening 136 as shown in FIGURES 9 and 11. Thus, when the tank 30 communicates with the inlet opening 136, access to the fill hole 120 is prevented. Accordingly, in order to fill the water tank 30, it must be removed from the pocket 28.

In addition to the fill hole 120 and outlet opening 122, an opening 138 is defined in the side wall 140 of the water tank. The opening 138 is covered with a flexible diaphragm 142 against which the protuberance 92 is adapted to project as shown in FIGURE 4(a). The block 94 is positioned so as to engage the side wall 140 of the water tank 30 to limit the penetration of the protuberance 92 against the diaphragm 142.

Figure 14:
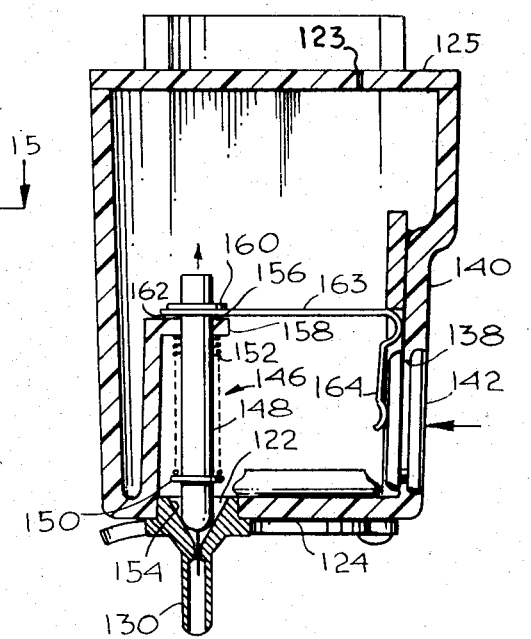
FIGURE 14 is a side sectional view taken substantially along the plane 14—14 of FIGURE 13.
Figure 15:
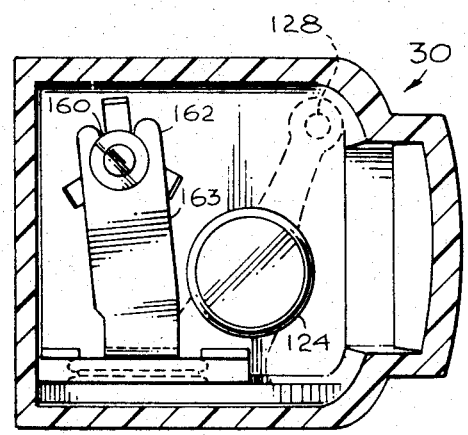
FIGURE 15 is a sectional view taken substantially along the plane 15—15 of FIGURE 13.

A valve assembly 146 is supported within the water tank 30 which assembly includes a valve member 148 having a flange 150 thereon which is normally urged by spring 152 against the valve seat 154 to close the outlet opening 122. The valve member 148 extends through and is adapted to slide in opening 156 defined in arm 158 projecting from the water tank wall. A flange 160 is secured to the valve member 148 above the arm 158. The forked end 162 of a valve lifting lever 163 is fitted beneath the flange 160 as is best shown in FIGURE 14. The lever 163 includes a depending portion 164 which is disposed in the water tank 30 immediately adjacent the flexible diaphragm 142.

When the rocker arm 82 is pivoted to the position shown in FIGURE 4(a), the protuberance 92 will push the diaphragm 142 inwardly to thus engage the portion 164 of lever 163. The forked end portion 162 of the lever 163 will thus bear against the flange 160 to force the valve member 148 upwardly against the force of spring 152. Thus, the valve member 148 is unseated from the seat 154 thereby permitting water drops to be dispensed through the outlet opening 122 and stem 130.

The steam chamber inlet opening 136 communicates with a steam generating chamber 170 defined within plate 50. More particularly, plate 50 is preferably comprised of first and second superposed halves 50A and 50B as shown in FIGURE 11. The halves are mated along a line 172 and define the steam chamber 170 therebetween. The steam chamber communicates with a steam discharge aperture 173 defined in the flat surface 54 of plate 50. Preferably, in order to prevent water drops from flowing directly from the inlet opening 136 and out through the aperture 173, the steam chamber 170 defines a tortuous path including a narrow passageway 174.

Portions 50A and 50B of plate 50 each define substantially semicircular channels 176 for retaining a sheathed electric heating rod 178 therein. Preferably, the channels 176 are slightly smaller than the dimensions of the heating rod 178 and are provided with a radius at their edges 180. In assembling the plate 50, the portions 50A and 50B are pressed together to deform the sheath on the heating rod 178 around the curved edges 180 in order to assure more intimate contact and good heat conductivity between the heating rod 178 and the plate 50. Although the plate 50 is illustrated in FIGURE 11 as being comprised of two portions 50A and 50B, it is also contemplated that the plate comprise a unitary casing with heating rod 178 being cast in.

FIGURES 9, 10, and 11 illustrate a steam channel 182 formed on the flat surface 54 of plate 50. Steam escaping from the steam aperture 173 is spread across the depth of the plate 50 by the channel 182 so as to thereby substantially uniformly apply steam to the fabric as the plates 50 and 56 are drawn across the fabric. It is to be noted that the steam channel 182 is disposed substantially at the center of the width of the plate 50 to thereby assure a sufficiently large heating plate area to either side of the steam channel so that regardless of the direction of movement of the device 10 relative to the fabric, there will be a plate area passing over the fabric after the steam channel 182 sufficient to dry the fabric.

It will be recalled that in order to prevent the casing from getting too hot, heat reflector sheets 39 are disposed on the inner surfaces of the casing panels 14, 16. In addition to these heat reflector sheets, a metallic heat shield 183 is disposed between and spaced from the plate 50 and the casing panel 14. The heat shield 183 is retained opposite to and spaced from the plate 50 (FIGURE 11) by heat insulating grommets 185 received around a fastening means, e.g. a screw threaded into the plate 50.

The heat shield 183 is preferably provided with perpendicular terminal flanges 187 substantially surrounding, in spaced relation, the plate 50.

The heating rod 178 has two terminals 184 and 186 (FIGURE 9). Terminal 184 is connected through wire 188 to one side of the power cord (e.g. screw terminal 189, FIGURE 1). Terminal 186 of the heating rod is connected via wire 190 to a first contact 192 of a thermostat assembly 194 shown in FIGURE 12. Contact 192 is supported on and insulated from a stacking post 196. Also supported on the post 196 is an arm 198 which supports an adjusting screw 200 for vertical movement with respect thereto. The adjusting screw 200 sets the position of lower contact 202. The position of upper contact 204 is controlled by a projection 206 carried by a bimetallic strip 208 which is temperature responsive.

The arm 198 is insulated via annular insulator 210 from flexible conductor 211 carrying contact 204. Conductor 211 is connected to conductive washer 212 which is connected via wire 213 to the second side of the power cord (e.g. screw terminal 214, FIGURE 1). An insulator 216 is supported on post 196 beneath the washer 212 and insulates it from previously mentioned contact 192. Contact 192 is however connected through leaf contact 218 to contact 202. Insulator 220 insulates leaf contact 218 from the bimetallic strip 208. It has been found that a temperature of approximately 255° F. is appropriate for pressing most fabrics and thus the adjusting screw 200 should be set accordingly.

Under normal circumstances, when the power cord is connected across a suitable potential source, the heating rod 178 will be energized through engaged contacts 202 and 204. (Although not critical, a suitable wattage rating for the heating rod would be 500 watts.) When the temperature reaches the preset level, the bimetallic strip 208 will bend to thereby move contact 204 away from contact 202 to thereby deenergize the heating rod 178. The temperature at which contact will be broken can be adjusted by adjusting the position of contact 202 by moving the adjusting screw 200.

In the utilization of the device 10, the user will initially connect the power cord 33 to a suitable source of power, fill the water tank 30 and then properly install it in pocket 28. The user will then hold the device in one hand with the rear casing surfaces 24 and 26 bearing against his palm and with his thumb positioned on rocker arm 82. By then depressing the rocker arm in one direction, the plates will open enabling him to insert the fabric to be pressed. He can then move the device 10 along the fabric while depressing, as needed, the rocker arm 82 to the position shown in FIGURE 4(a) to discharge water from the tank into the steam generating chamber 170, the resulting steam flowing through aperture 173 and channel 182 to the fabric. When the device 10 is not actually in use, it should preferably be placed vertically on a flat surface as shown in FIGURE 1 in order to facilitate the radiation of heat upwardly from the plates 50, 56 and discourage excessive heat buildup within the device or heat conduction to the casing panels. The heat reflective sheets 39 and heat shield 183 of course tend to direct the heat through the plates 50, 56 rather than through the casing panels 14, 16.

The device 10 may also be used to remove wrinkles, or otherwise condition fabrics and the like, with steam by holding it so that the forward edge of the device is slightly spaced from the fabric. With the rocker arm 82 depressed to open the water valve, steam flowing along the channel 182 and between the pressing plates 50 and 56, will impinge on the fabric.

From the foregoing, it should be appreciated that an exceedingly useful device has been disclosed herein capable of efficiently and effectively conditioning or pressing fabric as a consequence of the various significant features of the apparatus detailed herein.

What is claimed is:
1. An apparatus suitable for conditioning fabric comprising:
   a casing including first and second panels;
   a first plate carried by said first panel between said first and second panels, said first plate having a pressing surface opposed to said second panel;
   a second plate having a pressing surface;
   means mounting said second plate between said first plate and said second panel for translational and rotational movement, with the pressing surface thereof opposed to said pressing surface of said first plate, said mounting means including means for limiting the translation of said second plate relative to said first plate along first and second substantially perpendicular coplanar axes and means for limiting the rotational movement of said second plate relative to said first plate about a third axis extending substantially perpendicularly to said pressing surfaces;
   biasing means for urging said second plate into a predetermined position relative to said first plate; and
   manually actuatable means carried by said casing within the periphery thereof for acting in opposition to said biasing means to change the relative positioning of said first and second plates.

2. The apparatus of claim 1 including means for permitting only limited rotational movement of said second plate about said first and second axes and means for permitting only limited translational movement of said second plate along said third axis.

3. The apparatus of claim 1 including electrically energizable heating means for heating at least one of said plates.

4. The apparatus of claim 3 including temperature responsive means for controlling said heating means.

5. The apparatus of claim 1 including selectively actuatable means for dispensing steam between said plates; and
   manually actuatable control means carried by said casing for selectively, actuating said steam dispensing means.

6. The apparatus of claim 1 including selectively actuatable means for generating steam;
   manually actuatable control means carried by said casing for selectively actuating said steam generating means;
   an aperture defined in one of said plates opening on the pressing surface thereof; and
   means for directing said steam through said aperture toward the pressing surface of the other plate.

7. The apparatus of claim 6 wherein said means for generating steam includes a steam chamber;
   a water tank;
   means for dispensing water into said chamber;
   means for heating said chamber; and
   means for communicating said chamber with said aperture.

8. The apparatus of claim 7 including an actuatable valve within said water tank;
   a second manually actuatable means carried by said casing; and
   coupling means for enabling said second manually actuatable means to actuate said valve.

9. The apparatus of claim 8 wherein said coupling means includes a flexible area in the wall of said water tank.

10. The apparatus of claim 9 wherein said second manually actuatable means comprises a member mounted on said casing for movement with respect thereto;
   means for retaining said water tank in said casing with the flexible area thereof opposed to said second manually actuatable means; and
   means for limiting the movement of said second manually actuatable means against said flexible area.

11. The apparatus of claim 6 including a channel defined in the pressing surface of one of said plates and extending thereacross, said channel communicating with said aperture.

12. The apparatus of claim 8 wherein said first and second manually actuatable means comprise opposite ends of a single rocker arm; and
means for mounting said rocker arm for movement to actuate said actuatable means.

13. The apparatus of claim 7 wherein said steam chamber includes an inlet opening and said water tank includes a fill hole and an outlet opening; and
means for removably retaining said water tank in said casing for rendering said fill hole inaccessible when said water tank is so disposed that the outlet opening thereof communicates with said steam chamber inlet opening.

14. The apparatus of claim 1 wherein said pressing surfaces of said first and second plates have a low friction coating thereon.

15. The apparatus of claim 1 wherein the edges of said first plate adjacent the pressing surface thereof curve away from the edges of said second plate adjacent the pressing surface thereof thereby facilitating the insertion of fabric between said first and second plates.

16. The apparatus of claim 1 including heat shield means respectively disposed between said first plate and said first casing panel and between said second plate and said second casing panel.

17. The apparatus of claim 1 wherein the surfaces of said first and second casing panels remote from said first and second plates are irregular thereby defining a large surface area for radiating heat.

18. The apparatus of claim 1 wherein one of said plates defines a channel along one side thereof opening toward the other plate; and wherein
the other plate includes a flange along one side thereof extending into said channel.

19. The apparatus of claim 18 including means limiting the translation of said flange along said channel.

20. A device for conditioning trousers and the like comprising:
a casing having spaced panels;
first and second opposed plates mounted in said casing between said panels for movement relative to one another;
spring means urging said plates into engagement with one another;
a first manually actuatable means for opposing said spring means to move said plates away from one another; and
means for electrically heating one of said plates;
a second manually actuatable means for generating steam; and
means directing said steam between said plates.

21. The device of claim 20 wherein said first and second manually actuatable means respectively include first and second ends of a rocker arm mounted on said casing for rocking movement relative thereto.

22. The device of claim 21 wherein said second manually actuatable means includes a water tank having a wall;
an actuatable valve in said water tank;
an opening in said water tank wall; and
water tank retaining means for retaining said water tank with the opening in the wall thereof adjacent one end of said rocker arm whereby said rocker arm can be rocked to project into said wall opening to actuate said valve.

23. The device of claim 21 including a lever connected to said second plate; and
means retaining said lever adjacent one end of said rocker arm whereby said rocker arm can be rocked to engage said lever to move said second plate away from said first plate.

24. In a device for conditioning trousers or the like, in combination;
a casing having spaced panels;
opposed plates supported between said panels for movement relative to one another;
means for heating at least one of said plates; and
means including a water reservoir for providing steam between said plates;
said panels having portions thereof extending beyond one edge of said plates to provide a cavity therebetween for receiving at least said water reservoir.

25. The combination of claim 24 wherein said means for providing steam between said plates further includes means for selectively providing said steam whereby said reservoir may remain in said cavity at all times during operation of the device as either a dry or steam pressing device.

26. The combination of claim 24 including means for distributing said steam between said plates;
said steam distributing means comprising an elongated channel in one of said plates, said channel extending substantially the length of one axis of said one of said plates intermediate the ends thereof whereby portions of trousers or the like moving between said plates and substantially perpendicular to said channel are first subject to steam and then to a dry pressing surface.

27. The combination of claim 24 including means connecting said portions of said panels extending beyond said one edge of said plates for preventing said one edge from being touched when grasping the casing.

28. In a hand held device for conditioning trousers or the like, in combination;
a casing having spaced apart panels;
opposed plates supported for relative movement between said panels;
means for heating at least one of said plates;
means actuatable to provide steam between said plates; and
manually controllable means for selectively actuating said actuatable means.

29. The combination of claim 28 including means for distributing said steam between said plates;
said steam distributing means comprising an elongated channel in one of said plates, said channel extending substantially the length of one axis of said one of said plates intermediate the ends thereof whereby portions of trousers or the like moving between said plates and substantially perpendicular to said channel are first subjected to steam and then to a dry pressing surface.

30. A hand held device for conditioning trousers or the like, comprising:
a casing having spaced panels;
opposed plates supported between said panels for movement relative to one another;
bias means for effecting a first relative positioning of said plates;
means for changing the relative positioning of said plates in opposition to said bias means;
means for electrically heating at least one of said plates;
means for effecting the generation of steam; and
manually actuatable means for selectively rendering said effecting means operable.

31. A hand held device for conditioning trousers or the like, comprising:
a casing having spaced apart panels;
opposed plates supported by said casing intermediate said panels for movement relative to one another;
means for heating at least one of said plates;
means for controlling the operation of said heater;
said panels having portions thereof extending beyond one edge of said plates to provide a cavity therebetween for receiving at least a portion of said means for controlling the operation of said heater.

32. A pressing device adapted to be held by the hand between the thumb and one or more fingers for pressing fabrics or the like, said device comprising a pair of substantially rectangular plates disposed in overlying relation, the opposed inner faces of said plates providing pressing surfaces for fabric placed therebetween, a steam generating chamber carried by one of said plates and communicating with the pressing surface of said plate, heating means carried by said one plate for heating said surface and said steam generating chamber, a pair of heat insulated panel members overlying and substantially covering the outer faces of said plates to prevent the user's thumb and fingers from engaging said outer faces, said panel members having portions extending beyond one edge of said plates, means connecting the extending portions of said panels to prevent a user's hand from engaging said edge of said plates when holding the device, a water storage chamber disposed between said extending portions of said panel members and means for conducting water from said storage chamber to said steam generating chamber.

33. The device claimed in claim 32 in which the pressing surfaces of said plates are relatively movable toward and away from each other to accommodate the fabric to be pressed.

References Cited

UNITED STATES PATENTS

| | | | |
|---|---|---|---|
| 984,673 | 2/1911 | House | 38—71 |
| 2,461,006 | 2/1949 | Sowers | 38—71 |
| 2,748,511 | 6/1956 | Pezza | 38—71 |
| 2,807,896 | 10/1957 | Tay | 38—71 X |
| 3,211,325 | 10/1965 | Wisnicki | 38—97 X |

PATRICK D. LAWSON, *Primary Examiner.*